(12) United States Patent
Kwon et al.

(10) Patent No.: US 12,073,613 B1
(45) Date of Patent: Aug. 27, 2024

(54) PERCEPTION ADAPTATION USING PROBABILISTIC SIGNAL SPATIO-TEMPORAL LOGIC SYSTEM

(71) Applicant: HRL Laboratories, LLC, Malibu, CA (US)

(72) Inventors: Hyukseong Kwon, Thousand Oaks, CA (US); Alexie Pogue, Los Angeles, CA (US); Kevin Lee, Irvine, CA (US); Amir M. Rahimi, Santa Monica, CA (US); Amit Agarwal, San Francisco, CA (US); Rajan Bhattacharyya, Sherman Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 153 days.

(21) Appl. No.: 17/743,356

(22) Filed: May 12, 2022

Related U.S. Application Data (63) Continuation-in-part of application No. 17/030,354, filed on Sep. 23, 2020, now Pat. No. 11,334,767, and
(Continued)

(51) Int. Cl.
*G06V 10/98* (2022.01)
*G06F 17/11* (2006.01)

(52) U.S. Cl.
CPC .............. *G06V 10/98* (2022.01); *G06F 17/11* (2013.01)

(58) Field of Classification Search
None
See application file for complete search history.

(56) References Cited

U.S. PATENT DOCUMENTS 8,027,946 B1   9/2011  Daily
8,971,572 B1 *  3/2015  Yin .................... G06F 3/0304
                                                    345/173
(Continued)

OTHER PUBLICATIONS

Anand et al., "Specifying and Evaluating Quality Metrics for Vision-based Perception Systems," 2019 Design Automation and Test in Europe, Mar. 25, 2019, pp. 1433-1438. (Year: 2019).*

(Continued)

*Primary Examiner* — Reza Aghevli
(74) *Attorney, Agent, or Firm* — TOPE-MCKAY & ASSOCIATES (57) ABSTRACT

Described is a system for adapting to perception errors in object detection and recognition. The system receives, with a perception module, perception data from an environment proximate a mobile platform that reflects objects in the environment. Perception probes representing perception characteristics of object detections are generated from the perception data. Using the perception probes, spatial logic-based constraints and temporal logic-based constraints are generated. Spatial perception parameters are determined by solving an optimization problem using a set of the spatial logic-based constraints. Temporal perception parameters are determined by solving an optimization problem using a set of temporal logic-based constraints. The spatial perception parameters and the temporal perception parameters are combined to estimate a final perception parameter. The perception module is adjusted based on the final perception parameter.

15 Claims, 8 Drawing Sheets

Related U.S. Application Data a continuation-in-part of application No. 17/133,345, filed on Dec. 23, 2020, now Pat. No. 11,350,039, which is a continuation-in-part of application No. 17/030,354, filed on Sep. 23, 2020, now Pat. No. 11,334,767.

(60) Provisional application No. 63/188,947, filed on May 14, 2021, provisional application No. 62/984,713, filed on Mar. 3, 2020, provisional application No. 62/905,059, filed on Sep. 24, 2019.

(56) References Cited

U.S. PATENT DOCUMENTS

| | | | |
|---|---|---|---|
| 9,008,840 | B1 | 4/2015 | Ponulak |
| 9,626,591 | B2 | 4/2017 | Holz et al. |
| 10,699,419 | B2 | 6/2020 | Cui |
| 11,334,767 | B2* | 5/2022 | Kwon ............... G06F 18/2193 |
| 11,350,039 | B2* | 5/2022 | Kwon ............... H04N 23/60 |
| 11,823,461 | B1* | 11/2023 | Song ............... G01S 13/931 |
| 2011/0051992 | A1 | 3/2011 | Cobb |
| 2012/0188365 | A1 | 7/2012 | Stork |
| 2015/0378696 | A1 | 12/2015 | Boehm |
| 2016/0026253 | A1* | 1/2016 | Bradski ............. H04N 13/128 345/8 |
| 2016/0165193 | A1 | 6/2016 | Rasheed |
| 2017/0345398 | A1* | 11/2017 | Fuchs ............... G02B 27/0101 |
| 2017/0364831 | A1 | 12/2017 | Ghosh |
| 2018/0005118 | A1 | 1/2018 | Kapoor |
| 2019/0094981 | A1* | 3/2019 | Bradski ............. H04N 21/414 |
| 2019/0302439 | A1 | 10/2019 | Lyuboshenko |
| 2019/0378423 | A1* | 12/2019 | Bachrach ........... H04L 67/52 |
| 2020/0036743 | A1 | 1/2020 | Almukaynizi |
| 2020/0111005 | A1 | 4/2020 | Ghosh |
| 2020/0111012 | A1 | 4/2020 | Wan |
| 2020/0221009 | A1 | 7/2020 | Citerin |
| 2021/0011461 | A1 | 1/2021 | Fowler |
| 2021/0081751 | A1 | 3/2021 | Boss |

OTHER PUBLICATIONS

A. Dokhanchi, H. B. Amor, J.V. Deshmukh, and G. Fainekos, "Evaluating perception systems for autonomous vehicles using quality temporal logic," International Conference on Runtime Verification, pp. 409-416, 2018.
R.R. da Silva, V. Kurtz, and M. Hebert, "Active Perception and Control from Temporal Logic Specifications," arXiv:1905.03662, pp. 1-6, 2019.
S. Jha, V. Raman, D. Sadigh, and S.A. Seshia, "Safe Autonomy Under Perception Uncertainty Using Chance-Constrained Temporal Logic," Journal of Automated Reasoning, pp. 43-62, 2018.
D. Sadigh and A. Kapoor, "Safe control under uncertainty with Probabilistic Signal Temporal Logic, " in Proc. of Robotics: Science and Systems, pp. 1-10, 2016.
J. A. Stark, "Adaptive Image Contrast Enhancement Using Generalizations of Histogram Equalization," IEEE Transactions on Image Processing, vol. 9, No. 5, pp. 889-896, 2000.
V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, pp. 1-6, Jul. 2012.
YOLO Real Time Object Detection, located at pjreddie.com/darknet/yolo/, pp. 1-7, taken on Aug. 12, 2020.
Luminance Contrast, found at colorusage .arc. nasa .gov/luminance_cont.php, pp. 1-7, taken on Dec. 2, 2020.
Multiple Object Tracking Benchmark, located at motchallenge.net, pp. 1-3, taken on Aug. 12, 2020.
Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10.1007/s10278-007-9044-5.
Notice of Allowance for U.S. Appl. No. 17/133,345, Date mailed: Feb. 7, 2022.
A. Dokhanchi, H. B. Amor, J.V. Deshmukh, and G. Fainekos, "Evaluating perception systems for autonomous vehicles using quality temporal logic," International Conference on Runtime Verification, 2018, pp. 1-7.
R.R. da Silva, V. Kurtz, and M. Hebert, "Active Perception and Control from Temporal Logic Specifications," arXiv:1905.03662, 2019, pp. 1-6.
S. Jha, V. Raman, D. Sadigh, and S.A. Seshia, "Safe Autonomy Under Perception Uncertainty Using Chance-Constrained Temporal Logic," Journal of Automated Reasoning, 2018, pp. 43-62.
D. Sadigh and A. Kapoor, "Safe control under uncertainty with Probabilistic Signal Temporal Logic," in Proc. of Robotics: Science and Systems, 2016, pp. 1-10.
Joseph Redmon, Santosh Divvala, Ross Girshick, Ali Farhadi; The IEEE Conference on Computer Vision and Pattern Recognition (CVPR), 2016, pp. 779-788.
N. Wojke, A. Bewley and D. Paulus, "Simple online and realtime tracking with a deep association metric," 2017 IEEE International Conference on Image Processing (ICIP), Beijing, 2017, pp. 3645-3649.
YOLO: Real-Time Object Detection, https://pjreddie. com/darknet/yolo/, downloaded Dec. 15, 2020.
Office Action 1 for U.S. Appl. No. 17/030,354, Date mailed: May 6, 2021.
Response to Office Action 1 for U.S. Appl. No. 17/030,354, Date mailed: Aug. 5, 2021.
Office Action 2 for U.S. Appl. No. 17/030,354, Date mailed: Sep. 8, 2021.
Response to Office Action 2 for U.S. Appl. No. 17/030,354, Date mailed: Dec. 8, 2021.
Notice of Allowance for U.S. Appl. No. 17/030,354, Date mailed: Jan. 25, 2022.
The International Search Report and the Written Opinion of the International Searching Authority for PCT/US2020/066972; date of mailing Apr. 16, 2021.
Wu, Y., et al., "Active Control of Camera Parameters for Object Detection Algorithms," ariv.org, Cornell University Library, NY, 2017, pp. 1-7.
Anand, B., et al., "Specifying and Evaluating Quality Mertics for Vision-based Perception Systems," 2019 Design, Automation & Test in Europe Conference & Exhibition, EDAA, pp. 1433-1438.
Erkan, T.C., et al., "Simulation-based Adversarial Test Generation for Autonomous Vehicles with Machine Learning Components," 2018 IEEE Intelligent Vehicles Symposium, pp. 1555-1562.
Notification of Transmittal and The International Preliminary Report on Patentability (Chapter II) for PCT/US2020/066972; date of mailing Apr. 4, 2022.
Dokhanchi, H.B. Amor, J.V. Deshmukh, and G. Fainekos, "Evaluating perception systems for autonomous vehicles using quality temporal logic," International Conference on Runtime Verification, 2018, pp. 409-416.
"YOLO: Real-Time Object Detection", pjreddie/com/darknet/yolo/. Taken on May 27, 2021, pp. 1-7.
"Welcome to MOTChallenge: The Multiple Object Tracking Benchmark!", https://motchallenge.net, Taken on May 27, 2021, pp. 1-2.
"Itiple Object Tracking Benchmark", https://motchallenge.net/data/MOT20/. Taken on May 27, 2021, pp. 1-2.
Notification of Transmittal and the International Search Report, and the Written Opinion of the International Searching Authority for PCT/US2020/052342; date of mailing Feb. 2, 2021.
Yulong Wu, et al., "Active Control of Camera Parameters for Object Detection Algorithms", arxiv.org, Cornell University Library, 201. Olin Library Cornell University Ithaca, NY, 14853, May 16, 2017 (May 16, 2017), XP080948249.
Balakrishnan Anand, et al., "Specifying and Evaluating Quality Metrics for Vision-based Perception Systems", 2019 Design, Automation & Test in Europe Conference & Exhibition (Date), EDAA, Mar. 25, 2019 (Mar. 25, 2019), pp. 1433-1438, XP033550188.
Tuncali Cumhur Erkan, et al., "Simulation-based Adversarial Test Generation for Autonomous Vehicles with Machine Learning Com- (56) References Cited

OTHER PUBLICATIONS ponents", 2018 IEEE Intelligent Vehicles Symposium (IV), IEEE, Jun. 26, 2018 (Jun. 26, 2018), pp. 1555-1562, XP033423320.
Notification of Transmittal of the International Preliminary Report on Patentability (Chapter I) for PCT/US2020/052342; date of mailing Apr. 7, 2022.
The International Preliminary Report on Patentability (Chapter I) for PCT/US2020/052342; date of mailing Apr. 7, 2022.
Communication pursuant to Rules 161 (2) and 162 EPC for European Regional Phase Patent Application No. EP20803326.6, dated Nov. 14, 2022.
Response to the communication pursuantto Rules 161(2) and 162 EPC for European Regional Phase Patent Application No. EP20803326.6, dated May 4, 2022.
Communication pursuant to Rules 161 (2) and 162 EPC for European Regional Phase Patent Application No. EP20842899.5, dated Oct. 26, 2022.
Response to the communication pursuantto Rules 161(2) and 162 EPC for European Regional Phase Patent Application No. EP20842899.5, dated May 3, 2023.

\* cited by examiner

| Set | Original Precision | Adjusted Precision | Original Recall | Adjusted Recall |
|---|---|---|---|---|
| 1 | 98.73% | 99.21% | 43.21% | 43.55% |
| 2 | 98.43% | 98.84% | 40.46% | 41.07% |
| 3 | 96.59% | 97.85% | 44.95% | 48.17% |
| 5 | 96.45% | 97.76% | 22.06% | 25.03% |

PERCEPTION ADAPTATION USING PROBABILISTIC SIGNAL SPATIO-TEMPORAL LOGIC SYSTEM

CROSS-REFERENCE TO RELATED APPLICATIONS

This is a Continuation-in-Part application of U.S. application Ser. No. 17/030,354, filed in the United States on Sep. 23, 2020, entitled, "System and Method of Perception Error Evaluation and Correction by Solving Optimization Problems Under the Probabilistic Signal Temporal Logic Based Constraints," which is a Non-Provisional application of U.S. Provisional Application No. 62/905,059, filed on Sep. 24, 2019 AND U.S. Provisional Application No. 62/984,713, filed on Mar. 3, 2020, the entirety of which are hereby incorporated by reference.

This is also a Continuation-in-Part application of U.S. application Ser. No. 17/133,345, filed in the United States on Dec. 23, 2020, entitled, "Contrast and Entropy Based Perception Adaptation Using Probabilistic Signal Temporal Logic Based Optimization," which is a Continuation-in-Part application of U.S. application Ser. No. 17/030,354, filed on Sep. 23, 2020, which is a Non-Provisional application of U.S. Provisional Application No. 62/905,059, filed on Sep. 24, 2019 AND U.S. Provisional Application No. 62/984,713, filed on Mar. 3, 2020, the entirety of which are hereby incorporated by reference. U.S. application Ser. No. 17/133,345 is also a Non-Provisional application of U.S. Provisional Application No. 62/984,713, filed on Mar. 3, 2020, the entirety of which are hereby incorporated by reference.

This is ALSO a Non-Provisional Application of U.S. Provisional Application No. 63/188,947, filed in the United States on May 14, 2021, entitled, "Perception Adaptation Using Probabilistic Signal Spatio-Temporal Logic System," the entirety of which is incorporated herein by reference.

BACKGROUND OF INVENTION

(1) Field of Invention

The present invention relates to a system for perception error detection and adaptation and, more specifically, to a system for perception error detection and adaptation using spatio-temporal logic based axioms.

(2) Description of Related Art

Perception errors are still a challenging issue despite significant performance improvements in perception systems in the last decade. In autonomous driving or navigation systems, a great number of wrong detections and recognitions threaten the safe and robust performance of fully autonomous systems. In order to detect perception errors and recover from them, there have been a number of research directions, especially with formally verifying the systems using temporal logic, as described in Literature Reference Nos. 1-4 of the List of Incorporated Literature References. However, most of these research systems control the autonomous systems (vehicle or unmanned aerial vehicle (UAV)) themselves instead of fixing errors stemming from the perception systems.

To that end, a new approach was formulated by the inventors to detect perception errors and adapt perception parameters using probabilistic signal temporal logic (PSTL) based optimization, as described in U.S. application Ser. No. 17/030,354 and U.S. application Ser. No. 17/133,345, which are hereby incorporated by reference as though fully set forth herein. In that system, a more robust perception adaptation architecture was demonstrated by integrating a "spatial logic" process into the temporal logic process.

Nevertheless, a continuing need exists for a method for perception adaptation that provides a statistical bound for perception error detection and verification through the probabilistic signal temporal logic.

SUMMARY OF INVENTION

The present invention relates to a system for perception error detection and adaptation and, more specifically, to a system for perception error detection and adaptation using spatio-temporal logic based axioms. The system comprises one or more processors and a memory having instructions such that when the instructions are executed, the one or more processors perform multiple operations. The system receives, with a perception module, perception data from an environment proximate a mobile platform, the perception data reflecting one or more objects in the environment. A plurality of perception probes is generated from the perception data, wherein the plurality of perception probes represent perception characteristics of one or more object detections in the set of perception data. Using the plurality of perception probes, a plurality of spatial logic-based constraints is generated. Using the plurality of perception probes, a plurality of temporal logic-based constraints is generated. Spatial perception parameters are determined by solving an optimization problem using a set of the plurality of spatial logic-based constraints. Temporal perception parameters are determined by solving an optimization problem using a set of the plurality of temporal logic-based constraints. The spatial perception parameters and the temporal perception parameters are combined to estimate a final perception parameter, and the perception module is adjusted based on the final perception parameter.

In another aspect, the system produces instantaneous detection outputs and produces temporal tracking outputs.

In another aspect, for a temporal tracking output, the system generates the plurality of temporal logic-based constraints as follows:

$$G_{[t_c]}\left[\frac{1}{t_w}\sum_{t=t_c-t_w}^{t_c}\left(\int^{x(t)-\Delta x} p(s)ds\right) > Prob_T\right]$$

where $G_{[t_c]}$ is a global operator in the temporal logic, $t_c$ is a current time frame, $t_w$ is a time window for the temporal logic, $\Delta x$ is a control input, $p(s)$ is a probabilistic density function for the perception probe, $x(t)$ denotes a probe signal at time t, and $Prob_T$ is a probabilistic boundary for discerning between a valid sequence of object detections and an erroneous sequence of object detections.

In another aspect, the temporal perception parameters are determined according to the following:

$$\Delta x_T^i = \mathrm{argmin}_{\Delta m}\sum_{t=t_c-t_w}^{t_c} |x_i(t) - \Delta x - x_{Desired}|,$$

where i is an index of detected objects, $\Delta x$ is a control input, $t_c$ is a current time frame, $t_w$ is a time window for the temporal logic, $x_{Desired}$ is a desired signal value, and $x_i(t)$ denotes a probe signal at time t.

In another aspect, the system generates the plurality of spatial logic-based constraints as follows:

$$G_{[t]}\left[\frac{1}{n}\sum_{k=1}^{n}G_{[t]}(|x(k)-\Delta x - x_{Desired}| < Th) > Prob_S\right],$$

where $\Delta x$ denotes a control input, $x(k)$ denotes any given probe signal of a kth object, $Prob_S$ is the probability threshold for the spatial axiom, $G_{[t]}$ is a global operator in the temporal logic, n is the total number of objects at time t, $x_{Desired}$ is a desired signal value, and Th is the validity checking threshold for individual probes.

In another aspect, the spatial perception parameters are determined according to the following:

$$\Delta x_S = \arg\min_{\Delta x} \Sigma_i |x_i(t_c) - \Delta x - x_{Desired}|.$$

where $\Delta x$ denotes a control input, $x_i$ represents a probe signal for an $i^{th}$ object in the environment, $t_c$ is a current time frame, and $x_{Desired}$ is a desired signal value.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for perception error detection and adaptation and, more specifically, to a system for perception error detection and adaptation using spatio-temporal logic based axioms. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Dokhanchi, H. B. Amor, J. V. Deshmukh, and G. Fainekos, "Evaluating perception systems for autonomous vehicles using quality temporal logic," International Conference on Runtime Verification, 2018.
2. R. R. da Silva, V. Kurtz, and M. Hebert, "Active Perception and Control from Temporal Logic Specifications," arXiv: 1905.03662, 2019.
3. S. Jha, V. Raman, D. Sadigh, and S. A. Seshia, "Safe Autonomy Under Perception Uncertainty Using Chance-Constrained Temporal Logic," Journal of Automated Reasoning, 2018.
4. D. Sadigh and A. Kapoor, "Safe control under uncertainty with Probabilistic Signal Temporal Logic," in Proc. Of Robotics: Science and Systems, 2016.
5. "YOLO: Real-Time Object Detection", pjreddie/com/darknet/yolo/. Taken on May 27, 2021.

6. "Welcome to MOTChallenge: The Multiple Object Tracking Benchmark!", motchallenge.net. Taken on May 27, 2021.
7. "Itiple Object Tracking Benchmark", motchallenge.net/data/MOT20/. Taken on May 27, 2021.

(2) PRINCIPAL ASPECTS

Various embodiments of the invention include three "principal" aspects. The first is a system for perception error detection and adaptation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
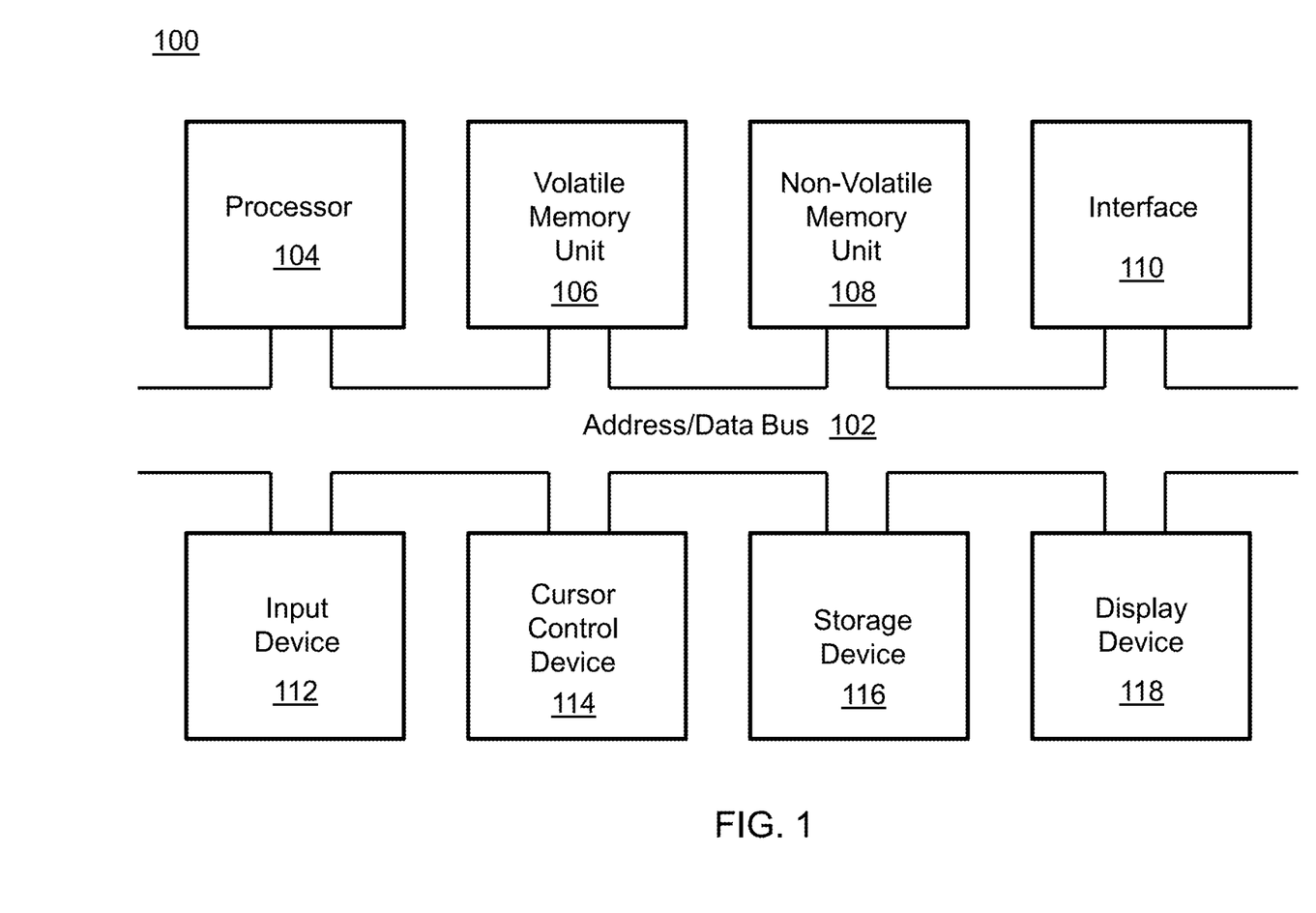
FIG. 1 is a block diagram depicting the components of a system for perception error detection and adaptation according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
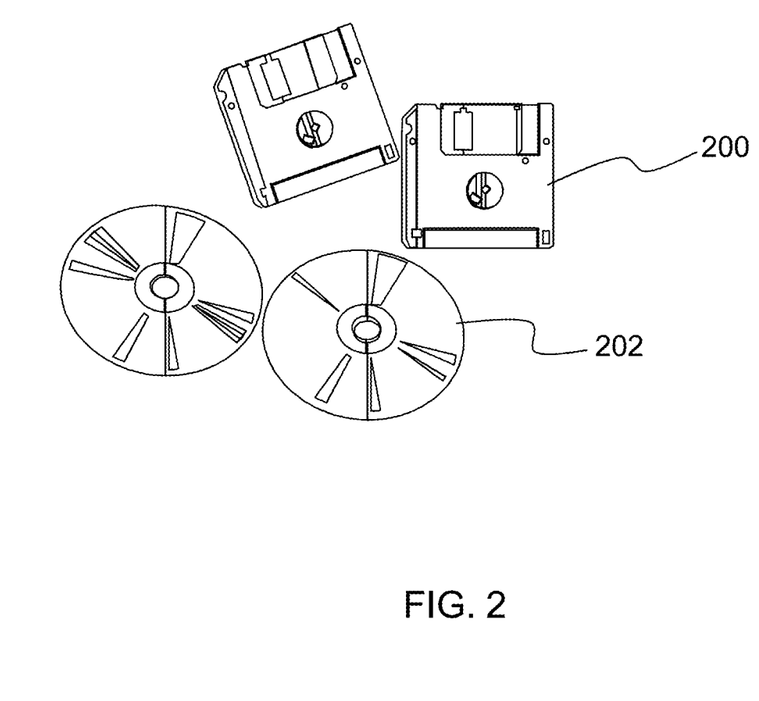
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a perception error detection and adaptation method using spatio-temporal logic based axioms. In addition to the previously developed temporal logic based axioms/constraints described in U.S. application Ser. No. 17/030,354 and U.S. application Ser. No. 17/133,345, the present invention integrates the spatial logic process dealing with instantaneous information among detected objects in a certain frame. Those two types of axioms, spatial logic and temporal logic, are integrated into one set of constraints for the perception adaptation process described herein. Then, the corresponding optimization problem is solved with the integrated constraints. The final perception parameter is estimated by combining the temporal process oriented result and the spatial process orientated results according to the instantaneous detection outputs and the temporal tracking outputs.

(3.1) Overview

Figure 3:
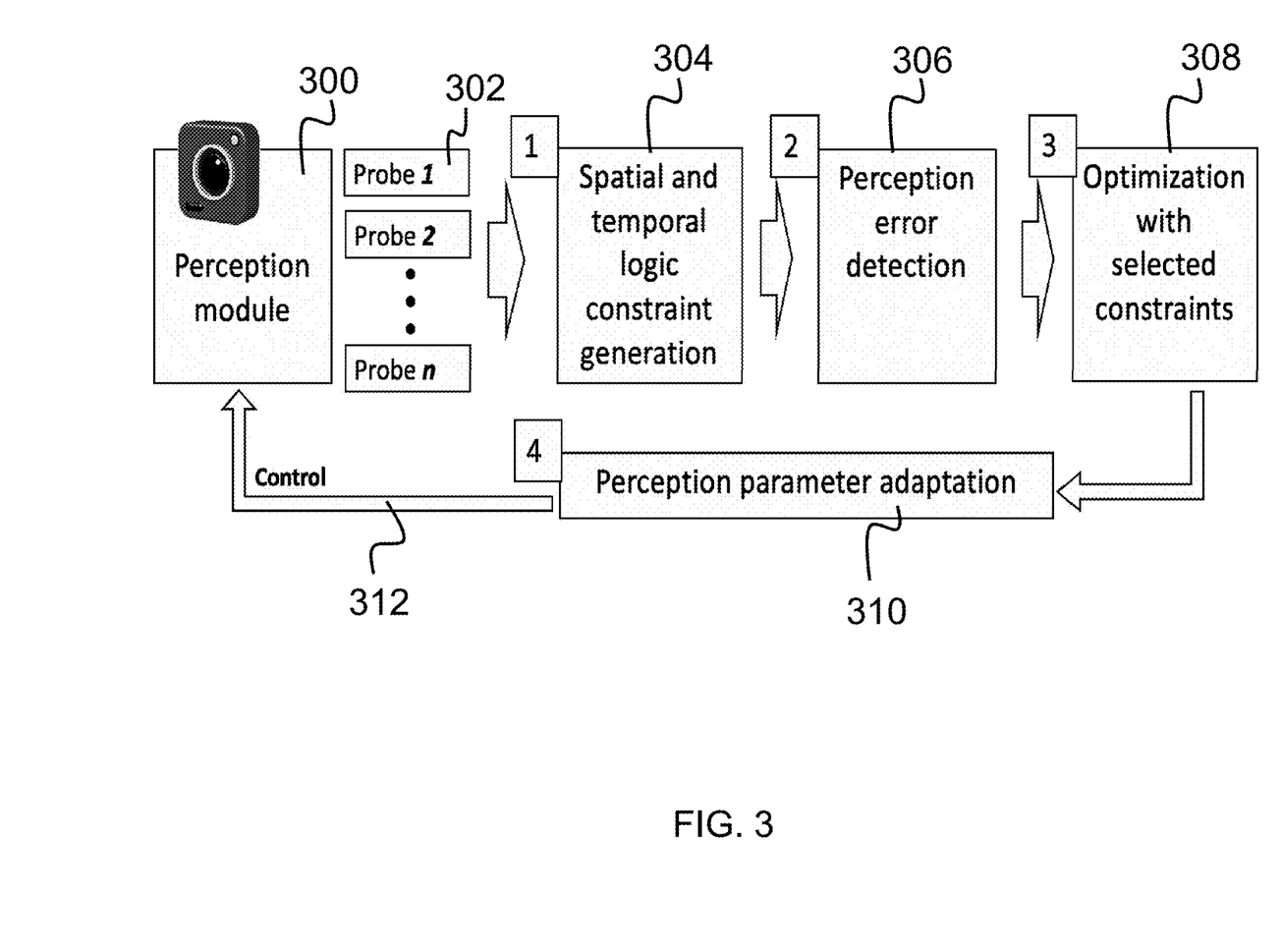
FIG. 3 is an overview illustrating the system for perception error detection and adaption according to some embodiments of the present disclosure.

A flow diagram illustrating an overview of the present invention is depicted in FIG. 3. First, probes 302 are generated from the perception data from the perception module 300 (e.g. cameras, etc.). Perception data can include raw images, and the detections and locations are probes 302. Probes 302 describe, or represent, characteristics of detections and recognitions, such as the size, type, tracking deviations, contrast, and entropy, are generated. Using the probes 302, in Step 1 304, spatial and temporal logic-based constraints for error detection and parameter adaptation are generated. Non-limiting examples of probes include size (e.g., 20 pixels high by 40 pixels wide), type (e.g., person), tracking deviation (e.g., −12 units), contrast (e.g., 20 units), entropy (e.g., 12 units). A generated constraint may be, for instance, that for detection, the probability of a person's height being less than 80 pixels is more than 95%.

In Step 2 306, erroneous perception issues (as determined based on a predetermined threshold, such as a benchmark metric) are detected and removed from the constraints' list. In other words, the erroneous probes are not classified as a detection, and the corresponding constraint is not used for the perception optimization process. For example, with the same ID in a certain time window, if the probability of a person's height being greater than 70 pixels is higher than a predetermined probability, then the tracking is accepted. Additionally, if a detection of a person at (x3, y3) having a height of 80 pixels would no longer be considered a detection, then any constraint generated from its probes would have to regenerated using only the probes of valid detections.

Step 3 308 describes solving the optimization to acquire the best perception parameters with the generated constraints in previous steps. Finally, in Step 4 310, the parameters for the control input 312 are applied to the perception module 300 for future processing. For further details regarding any of the above aspects, refer to U.S. application Ser. No. 17/030,354, which is hereby incorporated by reference as though fully set forth herein.

(3.2) Perception Probes Generation and Error Evaluation (Step 2 306 and Step 3 308)

As described in detail in U.S. application Ser. No. 17/030,354 and U.S. application Ser. No. 17/133,345, the first step in the process is to obtain the perception data along with characteristics of detections and recognitions. To get different types of characteristics efficiently, the state-of-the-art detection/recognition technique is used (e.g. YOLO v3 (see Literature Reference No. 5)). The following are the sample probes used in the invention described herein; however, this is not a complete list of possible probes that can be utilized.

Figure 4:
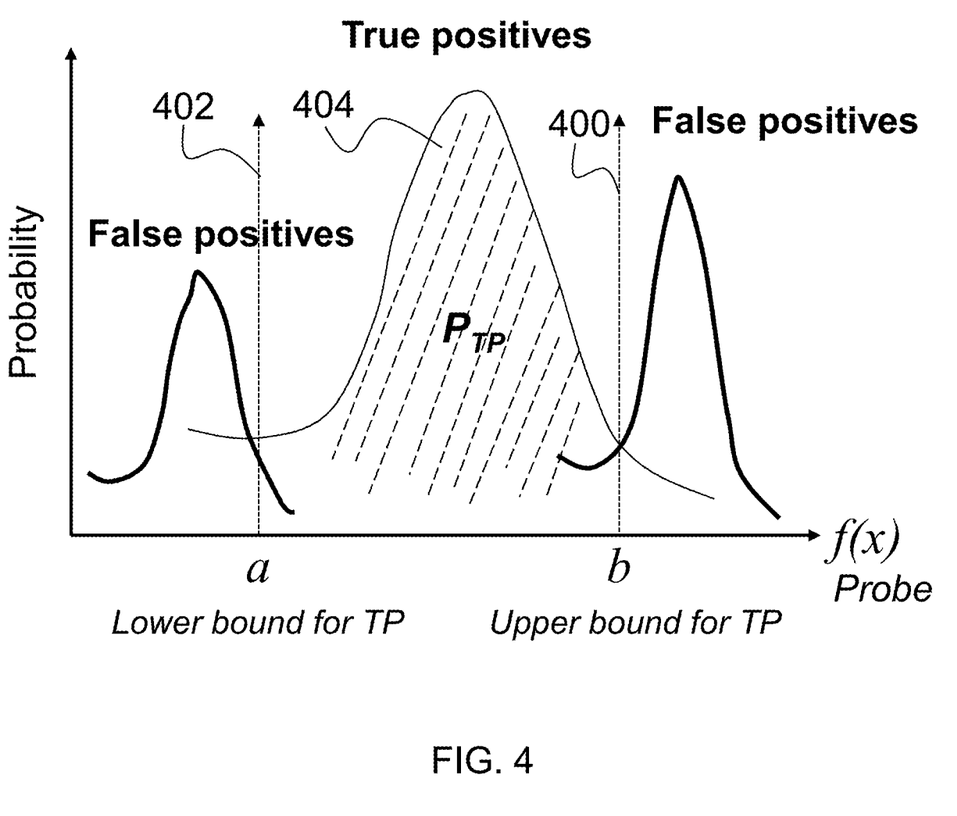
FIG. 4 is an illustration of probability distribution of a probe according to some embodiments of the present disclosure.

Object size (in the image plane and in the world coordinate frame)
Aspect ratio of the detected objects
Localization and tracking performance
Recognition confidence
Contrast of the detected boxes
Entropy of the detected boxes In the system described herein, there are multiple probes, such as detected object sizes, aspect ratios, recognition ID consistency, tracking deviations, and so on. From the true positive detections or recognitions, one can perform statistical analysis for each probe. FIG. 4 shows a descriptive example of a probe. For a detection/recognition, x, assume that a probe, f(x), is generated. By analyzing the values from true positives and also those from false positives, probabilistic distributions of true positives and false positives can be obtained, as shown FIG. 4. In one embodiment, the values of a and b are determined beforehand and provided to the system described herein. From the intersections between two different distribution graphs, one can set up the upper bound 400 and the lower bound 402 for true positives. The shaded area 404 presents the confidence probability, $P_{TP}$, of the probe. If this relation is described in a mathematical form (axiom) with the probabilistic signal temporal logic, it becomes as follows:

$$\forall x, Pr(a \leq f(x, t_s : t_e) \leq b \rightarrow y) \geq P_{TP},$$

where Pr(·) is the predicate and y is the true detection or recognition. $t_s : t_e$ means the time sequence between $t_s$ (start time) and $t_e$ (end time), so $f(x, t_s : t_e)$ is the probe sequence in the time frame of $t_s : t_e$. In other words, one can take it to be true (i.e., it is an axiom) that if, for all detections x occurring between a start time $t_s$ and an end time $t_e$, the value of the probe f lies between a and b, then the likelihood that the detections are true detections is at least $P_{TP}$ (e.g., 98%).

Depending on the probe dimensions, the probabilistic density function p(s) can also be multi-dimensional. Probe dimensions refer to how many probes are delivered into the system (i.e., the space of probes is multi-dimensional). By integrating all the available axioms from x, there is a "multi-dimensional range" of the corresponding detection or recognition. When the probabilistic signal temporal logic is violated with more than a certain threshold, it can be verified that the corresponding perception process is considered as an erroneous process. If only one probe's axiom is not satisfied, it is called an erroneous process.

Detecting perception errors is not sufficient to recover the perception quality in subsequent image sequences. Therefore, the perception modules 300 also need to be adjusted so that there are more accurate and robust detections and recognitions. In the present invention, an optimization technique using the PSTL-constraint-based optimization with the following format is utilized:

$$u_{OPT} = \operatorname*{argmin}_{u_t} J(x_t, u_t)$$

where $x_t$ is the probe state at time t and $u_t$ is the control input (e.g., shutter speed, ISO, aperture for a digital camera, or all three simultaneously) to the perception module. $J(\cdot)$ is the cost function of estimating perception errors. A non-limiting example of a cost function is $\Delta_c = \operatorname{argmin} \Sigma |c_i - c_{Desired} - \Delta_c|$, where the cost function will try to find $\Delta_c$ with minimizing the deviation from the desired value. The goal is to achieve the optimal $u_t$ to reduce perception errors. Therefore, minimizing $J(\cdot)$ can achieve the optimal perception module 300 control input 312. Eventually, the final optimization formula with the two or more PSTL-based constraints for probes, $f(x_t)$, $g(z_t)$, etc. becomes:

$$u_{OPT} = \operatorname*{argmin}_{u_t} J(x_t, z_t, u_t)$$
$$\text{s.t.} \quad \forall\, x_t,\, Pr(a \le f(x_t, t_s : t_e) \le b \to y) \ge P_{TPx}$$
$$\forall\, z_t,\, Pr(c \le g(z_t, t_s : t_e) \le d \to w) \ge P_{TPz}$$
$$\vdots$$

In PSTL there are guarantees that the system behaves according to these equations. It is important to show how this design meets these guarantees. Otherwise, it is not PSTL but an ad hoc or empirical approach.

(3.3) Probabilistic Signal Spatio-Temporal Logic

Figure 5:
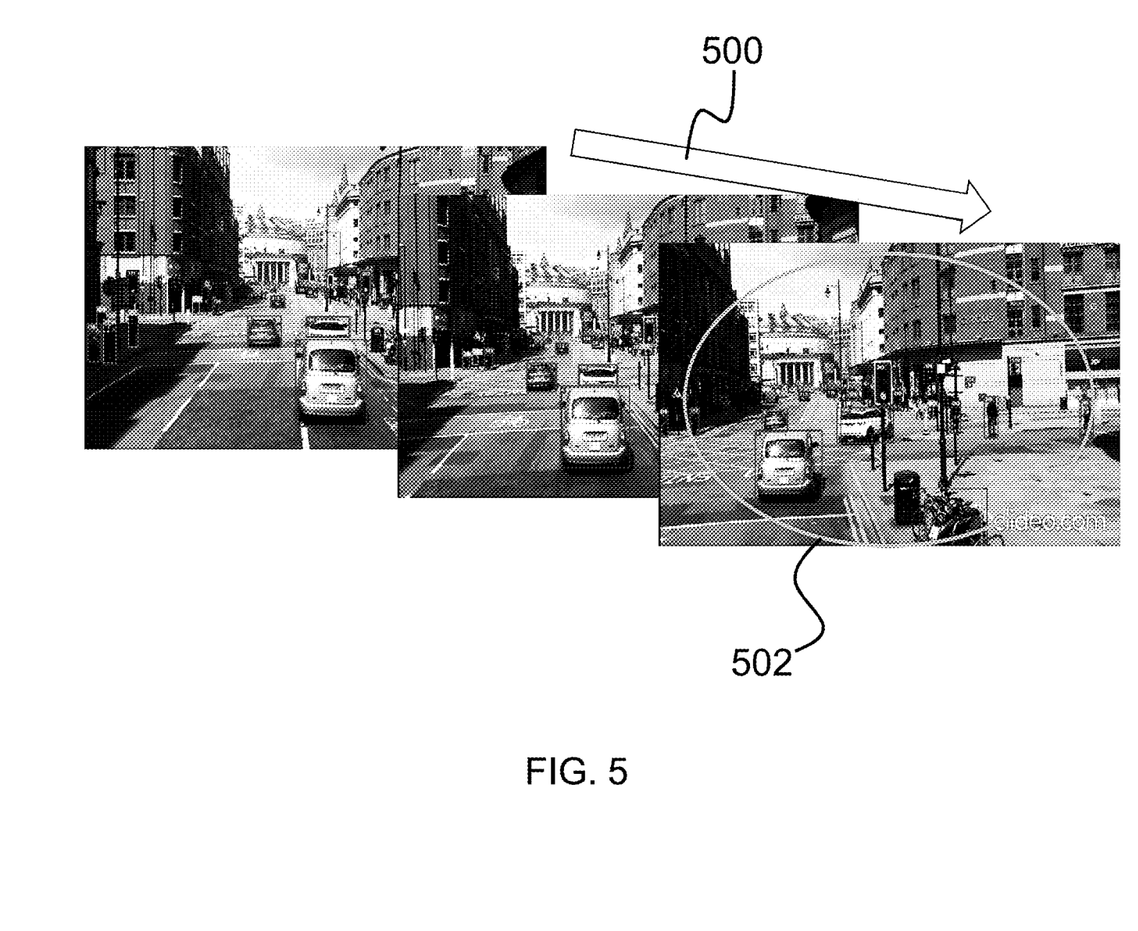
FIG. 5 is an illustration of spatio-temporal logic according to some embodiments of the present disclosure.

The axioms/constraints described herein are generated in the following two strategies. FIG. 5 is an illustration of spatio-temporal logic. For certain objects, temporally track and try to find the consistency to find some possible outliers over time (arrow 500), along with spatial distribution of detected objects in the corresponding frame (circle 502).

For certain tracked objects, set up the following probabilistic signal temporal logic based axioms/constraints for the probe signal, x(t) at time t:

$$G_{[t_c]}\left[\frac{1}{t_w}\sum_{t=t_c-t_w}^{t_c}\left(\int^{x(t)-\Delta x} p(s)ds\right) > Prob_T\right]$$

where $G_{[t_c]}$ is the global operator in the temporal logic, which means this axiom is satisfied in a certain time window with respect to time $t_c$ is the current time frame, $t_w$ is the time window for the temporal logic, p(s) is the probabilistic density function (i.e., curve that bounds region 404 in FIG. 4 and curve describing probability) for the corresponding probe, and $Prob_T$ is the probabilistic boundary for discerning between valid object sequences and erroneous object sequences. In other words, in a certain time window, the probability of the TP signal is always larger than the predefined threshold. With the above type of constraints, the optimization problem is set with the following:

$$\Delta x_T^i = \operatorname{argmin}_{\Delta x} \sum_{t=t_c-t_w}^{t_c} |x_i(t) - \Delta x - x_{Desired}|,$$

where $\Delta x$ is the control input, such that x is adjusted with deviation of $\Delta x$.

In addition to the temporal logic based constraints, a unique probabilistic spatial logic process at a certain time was added. It uses all (or only neighborhood) objects with the following:

$$G_{[t]}\left[\frac{1}{n}\sum_{k=1}^{n} G_{[t]}(|x(k) - \Delta x - x_{Desired}| < Th) > Prob_S\right],$$

where n is the total number of corresponding object information (i.e., n objects with the same probe signal) at time t, $x_{Desired}$ is the desired signal value, $Prob_S$ is the probability threshold for the spatial axiom which makes the axiom true (i.e., given from the value acquired experimentally), $G_{[t]}$ is the temporal logic's global operator, which means this axiom is satisfied in any time, x(k) is any given probe signal at time t, where k is the index of n objects, and Th is the validity checking threshold for individual probes. In other words, from n instances, with appropriate $\Delta x$, average deviation is always less than Th with $Prob_S$ probability. For this constraint, apply the following optimization problem:

$$\Delta x_S = \operatorname{arg\,min}_{\Delta x} \Sigma_i |x_i(t_c) - \Delta x - x_{Desired}|.$$

After both the temporal ($\Delta x_T$) and spatial ($\Delta x_S$) perception parameters are determined through the separate optimizations, they are combined into one perception parameter. $x_i$ denotes the probe signal for an $i^{th}$ object in the scene frame. Two different combination approaches are used depending on the deviations between the spatial adjustment and the temporal adjustment. Define the deviation between the spatial and temporal adjustments as:

$$Dev_C = \frac{|\Delta x_T - \Delta x_S|}{|\Delta x_T| + |\Delta x_S|},$$

where $Dev_C$ is the final perception parameter.

If $Dev_C \le Th_{Dev}$, it means that $\Delta x_S$ and $\Delta x_T$ are similar to each other, where $Th_{Dev}$ is the experimentally acquired threshold value (i.e., a given fixed value for the system). Then, more weights are put on the temporal component. With that condition, apply $\Delta x_S$ for the entire image, then for each tracking box, $b_i$, additionally apply $\Delta x_t^i - \Delta x_S$.

If $Dev_C > Th_{Dev}$, it means that there are big differences between the spatial and the temporal adjustment amounts. Then, linearly sum $\Delta x_S$ and $\Delta x_T$ with different weighting to the entire image as follows:

$$\Delta x = \alpha \cdot \Delta x_T + (1-\alpha) \cdot \Delta x_S,$$

where $\alpha$ is the weighting coefficient, and $\alpha$ is obtained through the confidence on the temporal tracking results. If the robust tracking outputs are close to the detection outputs, it is assumed that the tracking performance in the system can be trusted. Then, put more weight on $\Delta x_T$. If not, put less weight on $\Delta x_T$. With that direction, $\alpha$ is calculated with the number of tracking objects and the number of detected objects in the corresponding duration as shown in the following:

$$\alpha = \frac{\text{\# of tracking objects}}{\text{\# of detected objects}}.$$

With this approach, there are the following two intentions. First of all, with temporal consistency updates, since the statistical bounds of the probes are tracked, one can reduce the false positives (wrong detection or tracking). On the other hand, since the spatial constancy updates can improve the overall quality of the entire image, there is a chance to detect what did not show before, which means reducing false negatives.

(3.4) Experimental Studies

Figure 6:
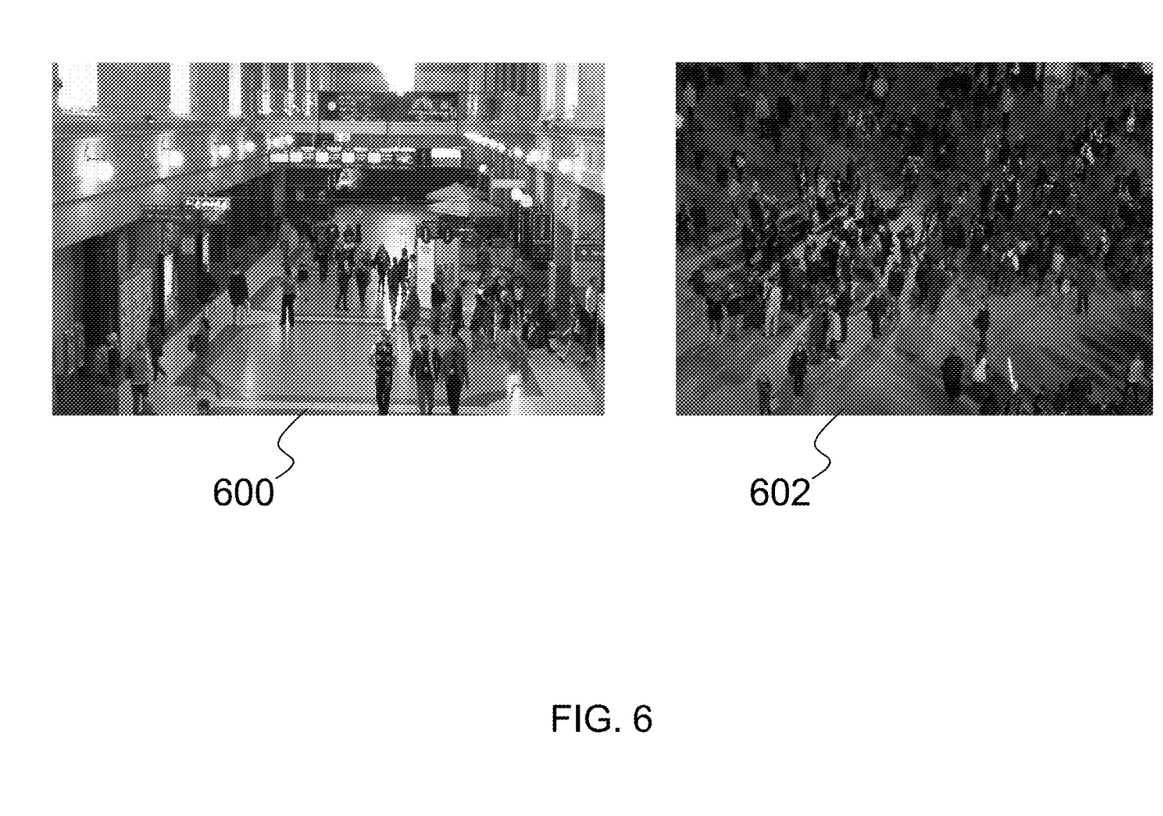
FIG. 6 is an illustration of sample screenshots of MOT-20 crowded scenes according to some embodiments of the present disclosure.

A simple test was performed on one of Multiple Object Tracking Benchmark datasets (see Literature Reference No. 6) for presenting experimental results. Specifically, MOT20 datasets (see Literature Reference No. 7) were used, which present challenging crowded scenes, especially with poor light conditions. FIG. 6 shows representative scenes 600 and 602 in the datasets. In the scenes 600 and 602 shown in FIG. 6, there are a number of person detections. For these videos, the "contrast" probes were selected, and the statistical patterns of person detection and tracking were acquired.

Figure 7:
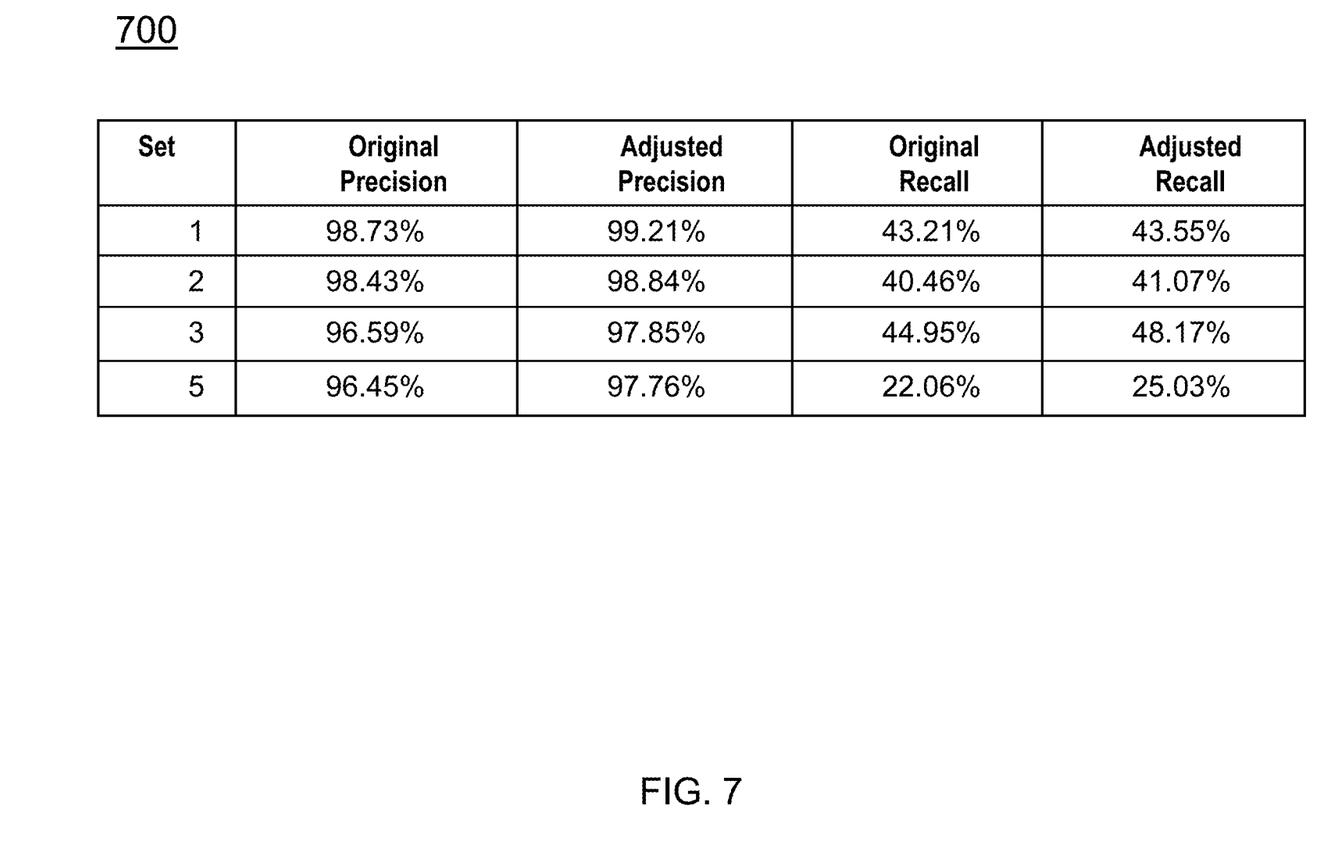
FIG. 7 is a table illustrating precision and recall rate comparisons between an existing method and the invention on a MOT-20 training set.

FIG. 7 is a table 700 depicting precision and recall rate comparisons between an original method (original precision and original recall columns) and the adjusted method (adjusted precision and adjusted recall columns) according to embodiments of the present disclosure on MOT-20 training set. As known by one skilled in the art, precision is defined as (correct detections)/(all detections), and recall is defined as (correct detections)/(all existing objects). As shown in FIG. 7, after processing using the invention described herein, the precision and recall rates are improved as shown in the table 700.

The unique advantages of the present invention are the following. By combining perception-based spatial logic and temporal logic into one framework, a more robust perception error detection and correction method is generated. Perception axioms are produced in spatial logic based instantaneous constraints and in temporal logic based tracking constraints. The resulting parameter from the two processes is adjusted using both the instantaneous detection outputs and the temporal tracking outputs. The spatio-temporal logic will reduce false positives and false negatives, simultaneously.

(3.5) Control of a Device

Figure 8:
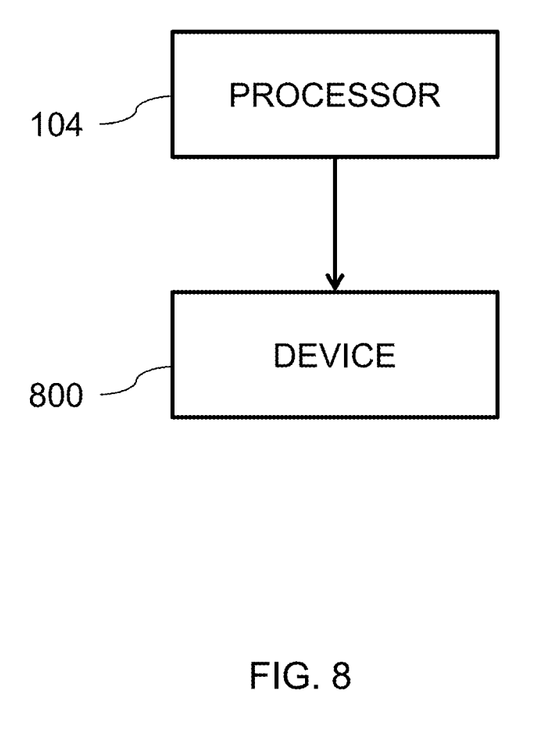
FIG. 8 is a block diagram depicting control of a device according to various embodiments.

As shown in FIG. 8, a processor 104 may be used to control a device 800 (e.g., a perception module 300 that captures perception data) based on solving the optimization problem. The control of the device 800 may be used to modify the parameters that are used in controlling a perception module 300. In other embodiments, the device 800 may be controlled to cause the perception module 300 device to move or otherwise initiate a physical action, such as changing directions or field-of-view. For example, actuators or motors are activated to cause the camera (or sensor) to move or zoom in or change a field-of-view.

The invention described herein supports computer vision and machine learning. For instance, in the field of vehicle manufacturing, lack of labeled data is a big bottleneck for data-driven approaches. With the PTSL object recognition system described herein, which uses only a few labels, classification is performed much quicker and more accurately. Furthermore, object detection and recognition process can facilitate autonomous cars with human instructions (e.g., construction worker, traffic officer). Based on the classification of an object, such as a pedestrian or stop sign, etc., the system described herein causes a vehicle/driving maneuver to be performed by the autonomous vehicle that corresponds to the class label identified by the system. For example, if the object is a construction worker or traffic officer holding up a hand to indicate "stop", the system can cause the autonomous vehicle to apply a functional response, such as a braking operation implemented by a braking mechanism within the vehicle, in order to bring the autonomous vehicle to a stop. Likewise, if the system recognizes a pedestrian running or walking in front of the vehicle, the system can cause the vehicle to stop to avoid hitting the pedestrian. Other appropriate vehicle maneuver responses may include one or more of a steering operation, a throttle operation to increase speed or to decrease speed, or a decision to maintain course and speed without change. The vehicle responses may be appropriate for avoiding a collision or altering travel speed. In one embodiment, if the system detects an object in its path (e.g., a pedestrian, another vehicle), an alert is sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance. As can be appreciated by those skilled in the art, other applications may also be applicable, such as those described in U.S. Provisional Application No. 62/984,713, filed on Mar. 3, 2020, the entirety of which is incorporated herein by reference as though fully set forth herein.

In summary, the invention described herein estimates and corrects perception errors with formal verification by solving probabilistic signal spatial and temporal logic-based optimization problems. Therefore, the present invention can be used in more robust autonomous driving systems, in autonomous unmanned systems, and also in more reliable ISR (intelligence, surveillance, reconnaissance) missions.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for adapting to perception errors in object detection and recognition, the system comprising:
one or more processors and a non-transitory computer-readable medium having executable instructions encoded thereon such that when executed, the one or more processors perform operations of:

receiving, with a perception module, perception data from an environment proximate a mobile platform, the perception data reflecting one or more objects in the environment;

generating a plurality of perception probes from the perception data, wherein the plurality of perception probes represent perception characteristics of one or more object detections in the set of perception data;

using the plurality of perception probes, generating a plurality of spatial logic-based constraints;

using the plurality of perception probes, generating a plurality of temporal logic-based constraints;

determining spatial perception parameters by solving an optimization problem using a set of the plurality of spatial logic-based constraints;

determining temporal perception parameters by solving an optimization problem using a set of the plurality of temporal logic-based constraints;

combining the spatial perception parameters and the temporal perception parameters to estimate a final perception parameter;

adjusting the perception module based on the final perception parameter;

producing instantaneous detection outputs; and producing temporal tracking outputs based on a probabilistic boundary for discerning between a valid sequence of object detections and an erroneous sequence of object detections.

2. The system as set forth in claim 1, wherein for a temporal tracking output, the one or more processors generate the plurality of temporal logic-based constraints as follows:

$$G_{[t_c]}\left[\frac{1}{t_w}\sum_{t=t_c-t_w}^{t_c}\left(\int^{x(t)-\Delta x} p(s)ds\right) > Prob_T\right]$$

where $G_{[t_c]}$ is a global operator in the temporal logic, $t_c$ is a current time frame, $t_w$ is a time window for the temporal logic, $\Delta x$ is a control input, $p(s)$ is a probabilistic density function for the perception probe, $x(t)$ denotes a probe signal at time t, and $Prob_T$ is the probabilistic boundary for discerning between a valid sequence of object detections and an erroneous sequence of object detections.

3. The system as set forth in claim 1, wherein the temporal perception parameters are determined according to the following:

$$\Delta x_T^i = \mathrm{argmin}\sum_{t=t_c-t_w}^{t_c}|x_i(t)-\Delta x - x_{Desired}|,$$

where i is an index of detected objects, $\Delta x$ is a control input, $t_c$ is a current time frame, $t_w$ is a time window for the temporal logic, $x_{Desired}$ is a desired signal value, and $x_i(t)$ denotes a probe signal at time t.

4. The system as set forth in claim 1, wherein the one or more processors generate the plurality of spatial logic-based constraints as follows:

$$G_{[t]}\left[\frac{1}{n}\sum_{k=1}^{n}G_{[t]}(|x(k)-\Delta x - x_{Desired}| < Th) > Prob_S\right],$$

where $\Delta x$ denotes a control output, $x(k)$ denotes any given probe signal of a kth object, $Prob_S$ is the probability threshold for the spatial axiom, $G_{[t]}$ is a global operator in the temporal logic, n is the total number of objects at time t, $x_{Desired}$ is a desired signal value, and Th is the validity checking threshold for the probe signal $x(k)$.

5. The system as set forth in claim 1, wherein the spatial perception parameters are determined according to the following:

$$\Delta x_S = \arg\min_{\Delta x}\sum_i|x_i(t_c)-\Delta x - x_{Desired}|.$$

where $\Delta x$ denotes a control input, $x_i$ represents a probe signal for an $i^{th}$ object in the environment, $t_c$ is a current time frame, and $x_{Desired}$ is a desired signal value.

6. A computer program product for adapting to perception errors in object detection and recognition, the computer program product comprising:

a non-transitory computer-readable medium having executable instructions encoded thereon, such that upon execution of the instructions by one or more processors, the one or more processors perform operations of:

receiving, with a perception module, perception data from an environment proximate a mobile platform, the perception data reflecting one or more objects in the environment;

generating a plurality of perception probes from the perception data, wherein the plurality of perception probes represent perception characteristics of one or more object detections in the set of perception data;

using the plurality of perception probes, generating a plurality of spatial logic-based constraints;

using the plurality of perception probes, generating a plurality of temporal logic-based constraints;

determining spatial perception parameters by solving an optimization problem using a set of the plurality of spatial logic-based constraints;

determining temporal perception parameters by solving an optimization problem using a set of the plurality of temporal logic-based constraints;

combining the spatial perception parameters and the temporal perception parameters to estimate a final perception parameter;

adjusting the perception module based on the final perception parameter;

producing instantaneous detection outputs; and producing temporal tracking outputs based on a probabilistic boundary for discerning between a valid sequence of object detections and an erroneous sequence of object detections.

7. The computer program product as set forth in claim 6, wherein for a temporal tracking output, the one or more processors generate the plurality of temporal logic-based constraints as follows:

$$G_{[t_c]}\left[\frac{1}{t_w}\sum_{t=t_c-t_w}^{t_c}\left(\int^{x(t)-\Delta x} p(s)ds\right) > Prob_T\right]$$

where $G_{[t_c]}$ is a global operator in the temporal logic, $t_c$ is a current time frame, $t_w$ is a time window for the temporal logic, $\Delta x$ is a control input, $p(s)$ is a probabilistic density function for the perception probe, $x(t)$ denotes a probe signal at time t, and $Prob_T$ is the probabilistic boundary for discerning between a valid sequence of object detections and an erroneous sequence of object detections.

8. The computer program product as set forth in claim 6, wherein the temporal perception parameters are determined according to the following:

$$\Delta x_T^i = \arg\min_{\Delta x} \sum_{t=t_c-t_w}^{t_c} |x_i(t) - \Delta x - x_{Desired}|,$$

where i is an index of detected objects, $\Delta x$ is a control input, $t_c$ is a current time frame, $t_w$ is a time window for the temporal logic, $x_{Desired}$ is a desired signal value, and $x_i(t)$ denotes a probe signal at time t.

9. The computer program product as set forth in claim 6, wherein the one or more processors generate the plurality of spatial logic-based constraints as follows:

$$G_{[t]}\left[\frac{1}{n}\sum_{k=1}^{n} G_{[t]}(|x(k) - \Delta x - x_{Desired}| < Th) > Prob_S\right],$$

where $\Delta x$ denotes a control output, x(k) denotes any given probe signal of a kth object, $Prob_S$ is the probability threshold for the spatial axiom, $G_{[t]}$ is a global operator in the temporal logic, n is the total number of objects at time t, $x_{Desired}$ is a desired signal value, and Th is the validity checking threshold for the probe signal x(k).

10. The computer program product as set forth in claim 6, wherein the spatial perception parameters are determined according to the following:

$$\Delta x_S = \arg\min_{\Delta x} \sum_i |x_i(t_c) - \Delta x - x_{Desired}|.$$

where $\Delta x$ denotes a control input, $x_i$ represents a probe signal for an $i^{th}$ object in the environment, $t_c$ is a current time frame, and $x_{Desired}$ is a desired signal value.

11. A computer implemented method for adapting to perception errors in object detection and recognition, the method comprising an act of:
  causing one or more processors to execute instructions encoded on a non-transitory computer-readable medium, such that upon execution, the one or more processors perform operations of:
  receiving, with a perception module, perception data from an environment proximate a mobile platform, the perception data reflecting one or more objects in the environment;
  generating a plurality of perception probes from the perception data, wherein the plurality of perception probes represent perception characteristics of one or more object detections in the set of perception data;
  using the plurality of perception probes, generating a plurality of spatial logic-based constraints;
  using the plurality of perception probes, generating a plurality of temporal logic-based constraints;
  determining spatial perception parameters by solving an optimization problem using a set of the plurality of spatial logic-based constraints;
  determining temporal perception parameters by solving an optimization problem using a set of the plurality of temporal logic-based constraints;
  combining the spatial perception parameters and the temporal perception parameters to estimate a final perception parameter;
  adjusting the perception module based on the final perception parameter;
  producing instantaneous detection outputs; and
  producing temporal tracking outputs based on a probabilistic boundary for discerning between a valid sequence of object detections and an erroneous sequence of object detections.

12. The method as set forth in claim 11, wherein for a temporal tracking output, the one or more processors generate the plurality of temporal logic-based constraints as follows:

$$G_{[t_c]}\left[\frac{1}{t_w}\sum_{t=t_c-t_w}^{t_c}\left(\int^{x(t)-\Delta x} p(s)ds\right) > Prob_T\right]$$

where $G_{[t_c]}$ is a global operator in the temporal logic, $t_c$ is a current time frame, $t_w$ is a time window for the temporal logic, $\Delta x$ is a control input, p(s) is a probabilistic density function for the perception probe, x(t) denotes a probe signal at time t, and $Prob_T$ is the probabilistic boundary for discerning between a valid sequence of object detections and an erroneous sequence of object detections.

13. The method as set forth in claim 11, wherein the temporal perception parameters are determined according to the following:

$$\Delta x_T^i = \arg\min_{\Delta x} \sum_{t=t_c-t_w}^{t_c} |x_i(t) - \Delta x - x_{Desired}|,$$

where i is an index of detected objects, $\Delta x$ is a control input, $t_c$ is a current time frame, $t_w$ is a time window for the temporal logic, $x_{Desired}$ is a desired signal value, and $x_i(t)$ denotes a probe signal at time t.

14. The method as set forth in claim 11, wherein the one or more processors generate the plurality of spatial logic-based constraints as follows:

$$G_{[t]}\left[\frac{1}{n}\sum_{k=1}^{n} G_{[t]}(|x(k) - \Delta x - x_{Desired}| < Th) > Prob_S\right],$$

where $\Delta x$ denotes a control input, x(k) denotes any given probe signal of a kth object, $Prob_S$ is the probability threshold for the spatial axiom, $G_{[t]}$ is a global operator in the temporal logic, n is the total number of objects at time t, $x_{Desired}$ is a desired signal value, and Th is the validity checking threshold for the probe signal x(k).

15. The method as set forth in claim 11, wherein the spatial perception parameters are determined according to the following:

$$\Delta x_S = \arg\min_{\Delta x} \sum_i |x_i(t_c) - \Delta x - x_{Desired}|.$$

where $\Delta x$ denotes a control input, $x_i$ represents a probe signal for an $i^{th}$ object in the environment, $t_c$ is a current time frame, and $x_{Desired}$ is a desired signal value.

* * * * *